United States Patent [19]
Langlet et al.

[11] Patent Number: 5,930,248
[45] Date of Patent: Jul. 27, 1999

[54] RADIO COMMUNICATION SYSTEM SELECTIVELY USING MULTICAST WITH VARIABLE OFFSET TIME

[75] Inventors: Carl Erik Joakim Langlet, Farentuna; Bo Anders Granstrom, Jarfalla, both of Sweden

[73] Assignee: Telefonaktiebolaget LM Ericsson, Stockholm, Sweden

[21] Appl. No.: 08/811,010

[22] Filed: Mar. 4, 1997

[51] Int. Cl.⁶ .................................................. H04Q 7/22
[52] U.S. Cl. ..................... 370/347; 370/442; 370/519; 375/347; 455/503; 455/676
[58] Field of Search ................................. 370/252, 321, 370/324, 328, 329, 332, 337, 338, 347, 350, 437, 442, 465, 519; 375/229, 231, 267, 335, 347; 455/422, 502, 503, 67.3, 67.6

[56] References Cited

U.S. PATENT DOCUMENTS 5,600,635  2/1997  Hamaki et al. .

FOREIGN PATENT DOCUMENTS

| 0124319 | 11/1984 | European Pat. Off. . |
|---|---|---|
| 0213780 | 3/1987 | European Pat. Off. . |
| 295226 | 12/1988 | European Pat. Off. . |
| 0335846 | 10/1989 | European Pat. Off. . |
| 0622911 | 11/1994 | European Pat. Off. . |
| 0773637 | 5/1997 | European Pat. Off. . |
| 2237706 | 5/1991 | United Kingdom . |
| WO95/04420 | 2/1995 | WIPO . |
| WO96/11533 | 4/1996 | WIPO . |

OTHER PUBLICATIONS

Yoshida et al., Article Delay Insertion Diversity of Extend Anti–Multipath Capability of DSK in Mobile Radio, 1986, IEEE International Conference on Communications.

L.B. Lopes, Combined Space/Time Diversity Technique for Narrowband TDMA Mobile Systems, May 19, 1989, Dept. of Electrical & Electronic Engineering, University of Leeds.

Morgensen et al., On Antenna–And Frequency Diversity in GSM Related Systems (GSM–900, DCS–18, and PCS1900), 1996, IEEE.

Morgensen, GSM Base–Station Antenna Diversity Using Soft Diversity Using Soft Decision Combining on Up–link and Delayed–Signal Transmission on Down–link, 1993, Danish Center for Personal Communication, Aalborg University, IEEE.

Primary Examiner—Chi H. Pham
Assistant Examiner—Frank Duong
Attorney, Agent, or Firm—Burns, Doane, Swecker & Mathis, L.L.P.

[57] ABSTRACT

A digital base station improves downlink coverage by allocating multicast and non-multicast channels based on the propagation property of an RF link between a mobile unit and a base station. The non-multicast channels are time slots during which information is transmitted from one antenna, and multicast channels are time slots during which information is transmitted from multiple diversity antennas. Transmission timing is offset from the diversity antennas by an amount that corresponds to the multipath propagation properties of the RF link.

75 Claims, 6 Drawing Sheets

RADIO COMMUNICATION SYSTEM SELECTIVELY USING MULTICAST WITH VARIABLE OFFSET TIME

BACKGROUND

This invention generally relates to the field of communication systems and, more particularly, to digital communication systems.

Some digital communication systems known as time division multiple access (TDMA) subdivide one or more radio frequency (RF) channels into a number of time slots during which mobile units within the system engage in digital voice and data communication. In these systems, the mobile units engage in communication through a plurality of scattered base stations, by transmitting and receiving bursts of digital information during allocated transmit and receive time slots. Existing TDMA systems utilize a number of access techniques that support duplex communication. For duplex communication, a TDMA/FDD communication system, such as one based on the Global System for Mobile (GSM) communication standard, uses separate receive and transmit RF channels.

Digital cellular radio telephone systems, which divide a geographical area up into cells, widely use TDMA communication systems for providing wireless communication among subscribers of mobile units and telephone units that are connected to a public switched telephone network (PSTN). Within each cell, a base station communicates with the mobile units over uplink and downlink RF channels. The base station transmits bursts of information to the mobile units over the downlink RF channels, and the mobile units transmit such bursts to the base stations over the uplink RF channels.

To avoid interference, neighboring cells are generally allocated different RF channels. Because of the relatively low power RF transmissions within a particular cell, another cell spaced two or more cells apart may typically reuse the same frequency. The farther the cells reusing the same frequencies are from each other, the lower the interference level between them. Therefore, for maintaining good quality RF communication links between the base stations and the mobile units, the frequency reuse cell pattern is an important factor in achieving a desired carrier-to-interference (C/I) ratio in a cell.

During the initial phase of a network, it is important to provide wide coverage using a smaller number of cells. With the increase in system capacity, it becomes necessary to increase the number of cells and reduce their size. Under this arrangement, it is essential to provide the RF link using a minimum amount of radiated power between the mobile units and the base station. To provide the uplink RF channels with minimized radiated power, it is customary to equip the base stations with low noise amplifiers, which are positioned at close proximity to the antennas of the base station. This arrangement improves the receiver sensitivity for the signals received from the mobile units. On the other hand, for the downlink RF channel, some conventional approaches rely on high power transmitters at the base station or booster amplifiers, which are positioned on the ground or on the mast of base station antennas. In addition to complicating operation and maintenance of the system, these approaches suffer from other serious drawbacks, including excessive heat generation at the base station and introduction of spurious noise.

Another conventional approach for extending communication coverage over downlink RF channels employs multicasting techniques. Multicasting techniques are widely used in analog communication systems for paging and trunked communication. Multicasting is especially beneficial for reaching mobile units that are positioned at the fringes of a communication coverage area. Most conventional multicasting techniques employ two or more separated antennas at each base station, to transmit the same messages over the same coverage area. The messages are multicasted either simultaneously or with some offset in time. In TDMA communication systems, the transmission times from the separated antennas are offset in order to introduce time diversity as well as space diversity to the multicast transmissions. The transmissions are offset in time by one or more symbol times, which are the durations of a corresponding number of data bits. Under well known theories, multicasting using antenna diversity and time diversity in TDMA systems improves coverage and communication quality. Some of these theories are disclosed in the following publications: *Artificial Delay Insertion Diversity To Extend Anti-Multipath Capability Of DSK In Mobile Radio*, Susumu Yoshida, Fumio Ikegami, Tsutomu Takeuchi, Sirikist Ariyavisitakul, and Masaaki Sasada, IEEE in 1986; *Combined Space/Time Diversity Technique For Narrowband TDMA Mobile Systems*, L. B. Lopes, Dept. of Electrical & Electronic Engineering, University of Leeds, May 19, 1989, Electronic Letters, Jul. 20, 1989; *GSM Base-Station Antenna Diversity Using Soft Decision Combining On Up-Link and Delayed-Signal Transmission on Down-link*, Preben E. Mogensen, Danish Center For Personal Communication, Aalborg University, IEEE 1993; and *On Antenna- And Frequency Diversity In GSM Related Systems* (GSM-900, DCS-1800, and PCS1900), Preben E. Mogensen and Jeroen Wigard, Danish Center for Personal Communication, Aalborg University, IEEE 1996.

While providing benefits, multicasting uses more of the valuable communication resources. In TDMA systems, for example, a number of communication time slots must be reserved for multicasting. Downlink multicasting in such TDMA systems uses a predefined number of time symbols for offsetting the transmission times during a number of reserved time slots. By multicasting during reserved time slots, valuable channel resources may be wasted, if multicasting on a particular link is not necessary. Furthermore, multicasting during reserved time slots increases interference within the system, especially the interference on channels that are reused in other cells. Therefore, there exists a need for a TDMA communication system that improves downlink communication coverage by multicasting on downlink RF channels without wasting communication resources unnecessarily.

SUMMARY

The present invention that addresses this need is exemplified in a digital communication system that allocates multicast and non-multicast channels based on propagation properties of the RF link between a mobile unit and a base station. In this way, the system of the present invention improves the downlink coverage only when necessary and avoids the waste of communication resources when multicasting is not needed.

In one aspect, the communication system of the invention provides communication coverage over radio frequency channels that are subdivided into a plurality of time slots during which information are communicated with at least one mobile unit. The system includes a base station that is linked to a mobile unit via one or more of the radio frequency channels. The base station includes a plurality of space and/or polarization diversity antennas, for transmitting the information on multicast and non-multicast channels. The non-multicast channels are time slots during which the information is transmitted from only one of the antennas, and the multicast channels are the time slots during which the same information is transmitted from more than one of the antennas. A controller allocates the multicast and non-multicast channels based on a measure of the propagation property of the radio frequency channels that link the mobile unit to the base station.

According to other aspects of the invention, the measure of the propagation property of the radio frequency channels linking the mobile unit to the base station corresponds to one or a combination of a measure of the received signal strength at the mobile unit, a level of bit error rate, or a measure of multipath propagation property of a signal transmitted from the mobile unit. In yet another aspect of the invention where discontinuous transmission is used, the base station, in response to a message indicating that the mobile unit would stop transmitting, measures co-channel interference. Under this arrangement, the controller is responsive to the measured co-channel interference for allocating the multicast and non-multicast channels. Moreover, the controller may also allocate or reallocate the multicast and non-multicast channels based on fault reports received from the base station. Preferably, in synchronized systems, the timing of the multicast channels allocated to the communication cells are offset by a number of time slots, to minimize interference within the system. Furthermore, the multicast and non-multicast channels may be selected based on measurements of disturbance levels during idle channels.

According to another aspect of the invention, the information is transmitted on the multicast channels from at least two antennas at separate times that are offset from each other by a multicast offset time. The multicast offset time corresponds to a measure of multipath propagation property of the radio frequency channels linking the mobile unit to the base station. In one embodiment, the multicast offset time is fixed by the controller. In another embodiment, the multicast offset time is dynamically generated to correspond to a time when the least amount of energy is detected from various propagation paths of the RF channel. If three or more antennas are used for multicasting, corresponding multicast offset times may be set for each one of the antennas. Preferably, an idle receiver section of the radio transceiver whose transmitter section is used for multicasting measures the multipath propagation property of the radio frequency channels. The receiver section includes an equalizer that provides corresponding correlator responses that correspond to the time when the least amount of energy is present. The multicast offset time is selected in multiples of time symbols within correlator time window.

In another feature of the present invention, the base station includes a plurality of radio transceivers (TRXs) having corresponding receiver and transmitter sections, which are coupled to the antennas. The TRXs exchange baseband data with each other over a baseband bus that allows selective addressing of the transmitter sections that are used for transmissions during the multicast channels. In this way, the same downlink data is transferred to multiple addressed transmitter sections over the baseband bus. The transmitter sections delay or advance the times of their corresponding transmissions according to the fixed or dynamically generated multicast offset time.

Other features and advantages of the present invention will become apparent from the following description of the preferred embodiment, taken in conjunction with the accompanying drawings, which illustrate, by way of example, the principles of the invention.

DETAILED DESCRIPTION

Figure 1:
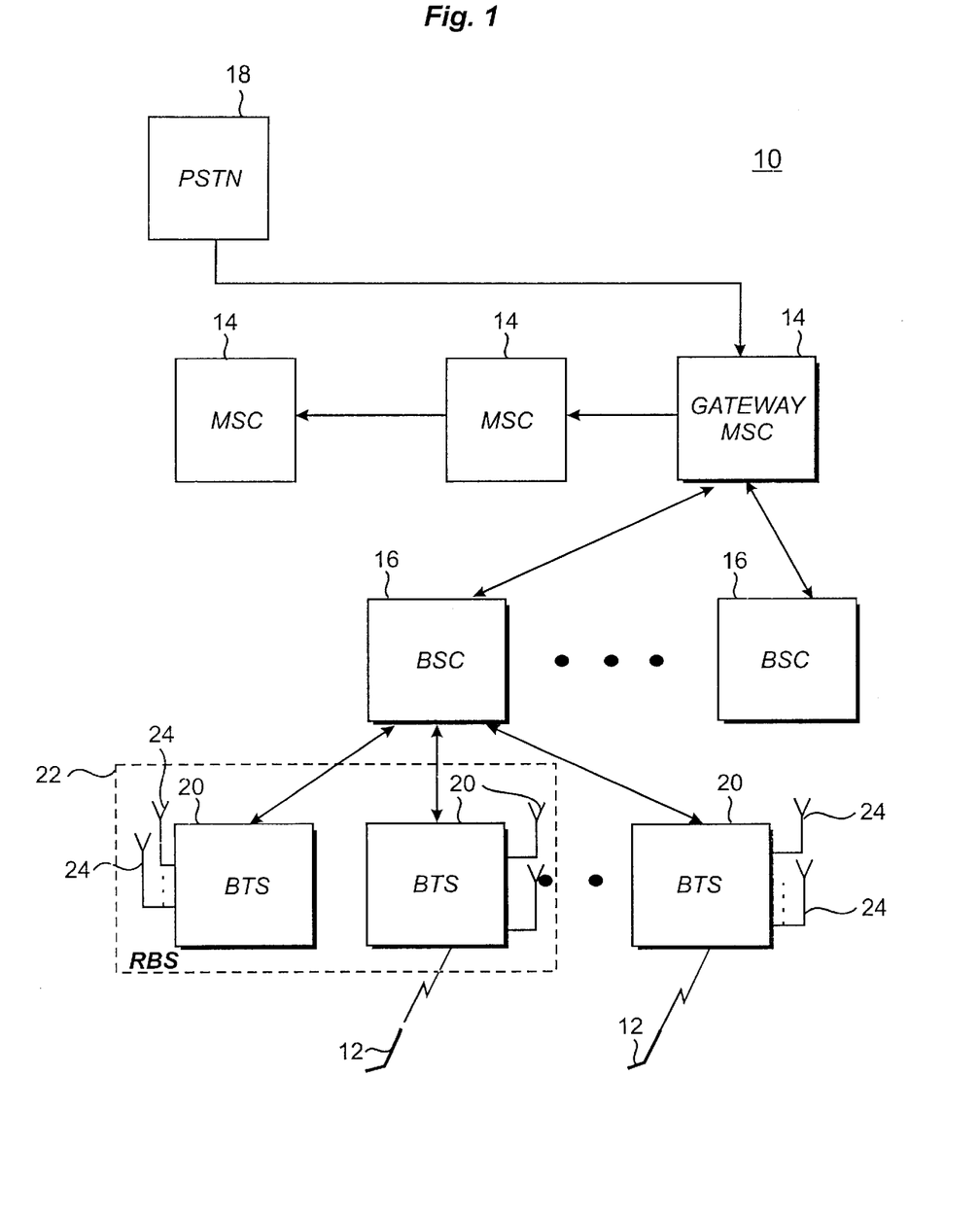
FIG. 1 is a block diagram of a communication system which advantageously uses the present invention.

Referring to FIG. 1, a communication system 10 according to an exemplary embodiment of the present invention operates according to the PanEuropean Digital Cellular System's GSM protocol or its equivalents. The mode of operation of the GSM communication systems is described in European Telecommunication Standard Institute (ETSI) documents ETS 300 573, ETS 300 574 and ETS 300 578, which are hereby incorporated by reference. Therefore, the operation of the system 10 is described to the extent necessary for understanding of the present invention. Although, the present invention is described as embodied in a TDMA system, those skilled in the art would appreciate that the present invention could be advantageously used in a wide variety of other digital communication systems, such as systems based on code division multiple access (CDMA).

The GSM system 10 is designed as a hierarchal network that includes multiple levels for managing calls. Using an allocated set of uplink and downlink RF channels, mobile units 12 operating within the system 10 participate in the calls over wireless RF links. At a high hierarchal level, a group of Mobile Service Switching Centers (MSCs) 14 are responsible for the routing of calls from an originator to a destination. In particular, they are responsible for setup, control and termination of the calls. The MSCs 14 also manage other services, such as collecting accounting information.

At a lower hierarchal level, a group of base station controllers (BSCs) 16 are interconnected to each one of the MSCs 14. The primary function of a BSC 16 is mobility management. As the mobile units 12 move around, they are likely to move out of one cell and into another. The process by which the calls are maintained without a noticeable break is known as hand over. Based on reported received signal strength at the mobile units 12, the BSC 16 determines whether to initiate a hand over. The BSC 16 communicates with a MSC 14 under a standard interface known as the A-interface, which is based on the Mobile Application Part of CCITT Signaling System No. 7. One of the MSCs 14, known as the gateway MSC, handles communication with a Public Switched Telephone Network (PSTN) 18, or other public and private networks.

At a still lower hierarchal level, a group of base transceiver stations (BTSs) 20 are controlled by each one of the BSCs 16. The BTSs 20 primarily provide the RF links for the transmission and reception of bursts to and from the mobile units 12. In a preferred embodiment of the invention, a number of BTSs 20 are incorporated into a radio base station (RBS) 22. In an exemplary embodiment, the RBS 22 is configured according to a family of RBS-2000 products, which is offered by L M Ericsson, the assignee of the present invention.

The system 10 subdivides a geographical area into contiguous communication cells that together provide communication coverage to a service area, for example, an entire city. The communication cells are patterned according to a cell pattern that allows some of the spaced apart cells to use the same uplink and downlink RF channels. In this way, the cell pattern of the system 10 reduces the number of frequency channels needed to cover the service area. The system 10 also employs frequency hopping techniques, to avoid 'deadspots' and to minimize interference in the system. Also, as described later in detail, the system 10 employs a time alignment technique, to cope with propagation delays.

As described later in detail, each BTS 20 includes a number of TRXs that use the uplink and downlink RF geographica serve a particular common geographical area, such as one or more communication cells. The RF channels, which are subdivided into time slots, constitute wireless links between the BTS 20 and the mobile units 12 within a corresponding cell. Under the GSM specification, digital data is modulated onto the RF channels using Gaussian Minimum Shift Keying (GMSK) modulation technique, to provide a gross data rate of 270 kb/s. The TRXs receive and transmit uplink and downlink signals via a number of space diversity, or polarization diversity or a combination of space and polarization diversity antennas 24.

According to one aspect of the present invention, the communication system 10, allocates the time slots for the transmission of downlink information as multicast and non-multicast channels. The non-multicast channels are time slots during which information is transmitted once, preferably, from a single antenna 24. The multicast channels are time slots during which the same information is transmitted from two or more antennas 24, using more than one transmitter. By multiple transmissions, the multicast channels provide better coverage on the downlink path by accommodating a higher path loss and reducing fading dips.

The communication system 10 uses the BSC 16 for allocating the multicast and non-multicast channels. The BSC 16 instructs the RBS 22 to transmit the information either via the multicast or non-multicast channels. The BSC 16 instructs the RBS 22 based on measures of propagation properties of the RF channels that link the mobile units 12 to the RBS 22. As described later in detail, the propagation properties may be measured based on a number of parameters, including received signal strength at the mobile unit 12, bit error rate at the mobile unit 12, the multipath propagation property of the uplink RF channel, or a combination of them. By taking into account the propagation properties of each one of the linking RF channels, the communication system 10 improves the system's downlink coverage by efficiently allocating multicast communication resources without wasting unnecessary resources.

Furthermore, the BSC 16 can dynamically reallocate the multicast and non-multicast resources based on operating requirements of the system, for example, based on fault conditions reported by the RBS 22. In addition, the BSC 16 could dynamically increase the number of time slots allocated for multicast transmission, if the propagation properties of the linking RF channels so require. For example, when a large number of mobile units 12 are positioned at the fringes of a communication cell with degraded RF links on the non-multicast channels, the BSC 16 can designate some of the non-multicast channels as multicast channels, to improve the downlink coverage. Similarly, the BSC 16 could reallocate the multicast channels as non-multicast channels, if the propagation properties of the RF channels are such that multicasting is not necessary. In this way, the BSC 16 can regularly adjust the size of the pools of channels used for multicasting or non-multicasting.

All signaling functions pertaining to call management in the system, including initiations, hand overs, and termination are handled via control information transmitted over signaling channels. The signaling channels may be transmitted during dedicated time slots or they may be transmitted in association with a number of traffic channels.

The functions of some of the dedicated downlink RF channels are: Broadcast Control Channel (BCCH), which is transmitted at the first time slot (time slot 0) of the downlink RF channel, provides the mobile units with information about the BTSs 20, such as a BTS identity.

Standalone Dedicated Control Channel (SDCCH), which is transmitted at a time slot adjacent to the BCCH, is used for registration, location updating, authentication and call set-up. Paging channel is a downlink only channel, for informing the mobile unit of a network signaling requirement, for example when the mobile unit is called.

Access Grant Channel is a downlink only channel used for replies to access requests, for assigning a dedicated control channel for subsequent signaling.

Some of the individual functions of the associated signaling channels are defined below:

Slow Associated Control Channel (SACCH) is used for communicating control and supervisory signals associated with a number of traffic channels, including the transmission of an RX-QUAL parameter that corresponds to a measure of bit error, and an RX-LEV parameter that correspond to a measure of received signal strength at the mobile unit.

Fast Associated Control Channel (FACCH) steals time slots allocated for associated traffic channels for control requirements, such as handover.

Figure 2:
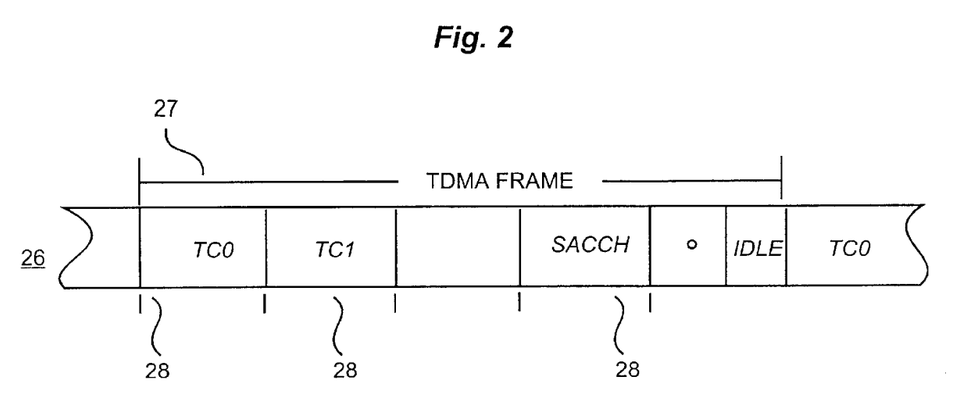
FIG. 2 is a diagram of a subdivided RF channel that is used in the communication system of FIG. 1.

With reference to FIG. 2, an RF channel 26 (uplink or downlink) is divided into repetitive time frames 27 during which information are transmitted. Each frame is further divided into time slots 28 that carry packets of information. Speech data is transmitted during time slots designated as traffic channels (TC0, TC1 . . . ). The signaling information is transmitted during time slots allocated for signaling channels, such as SACCH.

During each frame 27, one or more time slots 28 are designated as signaling channels with the remaining time slots allocated as traffic channels. For each cell, the BSC 16 allocates certain time slots on an RF channel as signaling channels. Preferably, the BSC 16 designates all dedicated signaling channels as multicast channels, to insure important signaling information reaches all the mobile units 12 within a communication cell. The associated signaling channels are allocated as multicast channels, if their corresponding traffic channels are allocated as multicast channels.

The system 10 carries out the transmission of information during the time slots in bursts that contain a predefined number of encrypted bits. The GSM specification defines various types of bursts: normal bursts (NB), frequency correction bursts (FB), synchronization bursts (SB), access bursts (AB), and dummy bursts. The normal bursts, which have a duration of 557 µS, are used both during the traffic and some signaling channel. The remaining bursts are primarily used for maintaining signal and data synchronization within the system.

Figure 3:
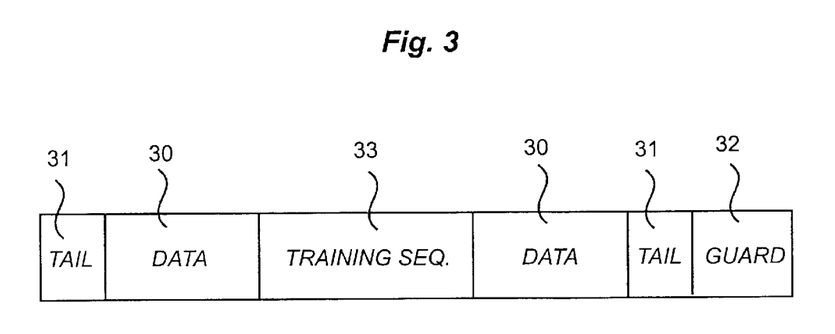
FIG. 3 is a diagram of a normal transmission burst transmitted on the RF channel of FIG. 2.

As shown in FIG. 3, a normal burst 29 includes two separate data portions 30 during which digital data bits are communicated. The normal burst also includes tail and guard sections 31 and 32 as shown. To compensate for propagation delays, the communication system 10 uses a time alignment process by which the mobile units 12 align their burst transmissions to arrive at the BTSs 20 in proper time relationship relative to other bursts transmissions. All burst transmissions, except dummy burst transmissions, include training sequences. The training sequences are patterned with predefined autocorrelation characteristics. During demodulation and decoding process, the auto correlation characteristic of the training sequence helps in the synchronization of the received bit sequences over an RF channel. In the normal burst 29, a training sequence 33, which has 26 bits, is positioned in the middle of the burst between its data portions. As described later, the mobile unit 12 and the RBS 22 incorporate equalizers, which correlate received baseband bit sequences over the uplink or downlink RF channels with the training sequences, to provide correlator responses that correspond to the multipath properties of the propagation path.

Figure 4:
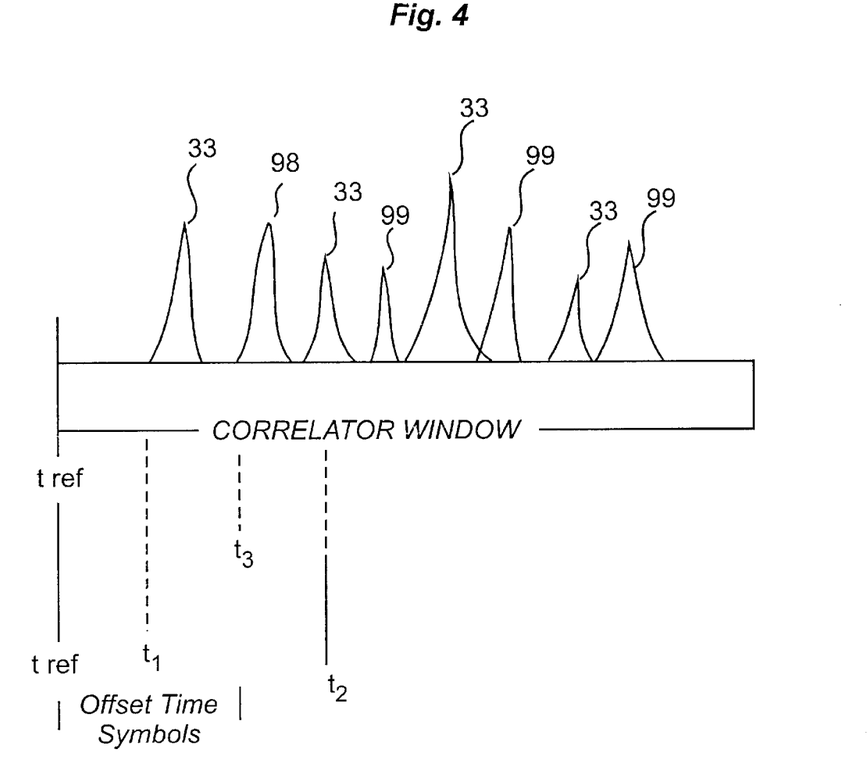
FIG. 4 is a timing diagram of correlator responses generated in the communication system of FIG. 1.

With reference to FIG. 4, a diagram showing correlator responses generated by an equalizer based on a training sequence is shown. Because of the autocorrelation properties of the training sequence, the correlator responses include correlator peaks 33 that correspond to energies received from the various propagation paths of a transmitted wave. The correlator peaks 33 are offset from a time reference (t ref) and from each other according to propagation durations of the various propagation paths of the transmitted wave. As described later, corresponding receiver sections at the RBS 22 and the mobile unit 12 use the correlator responses to predictively demodulate their received baseband signals. Based on the correlator responses, the equalizer in the receiver section of the RBS 20 generates a time alignment (TA) parameter, which correspond to the propagation delays over the uplink RF channel. The mobile unit 12 uses the TA parameter, which is transmitted from the RBS 22, for advancing or retarding its burst transmissions relative to a time reference.

Figure 5:
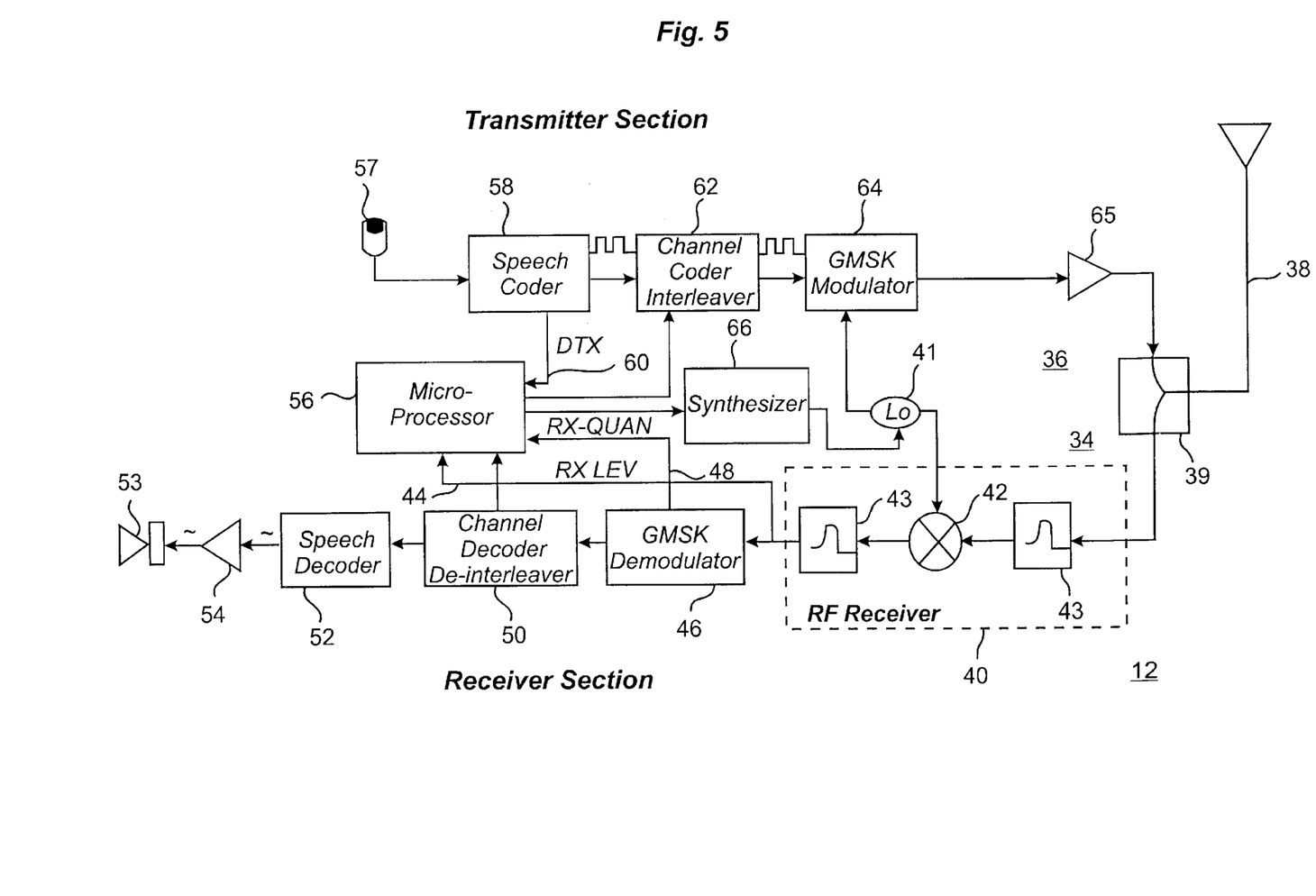
FIG. 5 is a block diagram of a mobile unit used in the communication system of FIG. 1.

With reference to FIG. 5, the block diagram of a mobile unit 12 is shown. The mobile unit 12 includes a receiver section 34 and a transmitter section 36, which are coupled to an antenna 38 through a duplexer 39. The antenna 38 is used for receiving and transmitting RF signals to and from the BTS 20 over allocated uplink and downlink RF channels. The receiver section 34 includes an RF receiver 40, which includes a local oscillator 41, a mixer 42, and selectivity filters 43 arranged in a well known manner, for down conversion and demodulation of the received signals to a baseband level. The RF receiver 40, which is tuned by the local oscillator 41 to the downlink RF channel, also provides an RX-LEV signal on line 44 that corresponds to the received signal strength at the mobile unit.

The RF receiver provides a baseband signal to a GMSK demodulator 46 that demodulates coded data bits representing the received speech and signaling information. As described above, the GMSK demodulator 46 includes an equalizer (not shown) that processes the coded bit pattern disposed on the training sequences, to provide correlator response that are used for predictive demodulation of the baseband signal. The equalizer uses the correlator responses to determine the most probable bit sequence for demodulation. As defined by the GSM specification, the demodulator also provides an RX-QUAL signal on line 48, which is a measure of various levels of bit error rate at the mobile unit 12. The mobile unit 12 reports the RX-QUAL signal and the RX-LEV signal to the BSC 16 on the SACCH channel.

A channel decoder/de-interleaver 50 decodes and de-interleaves the coded data bits, to determine whether they are speech or signaling information. The speech data bits are applied to a speech decoder 52 that decodes the speech pattern. After decoding, the speech decoder 52 applies an analog speech signal to a speaker 53 via an audio amplifier 54. The channel decoder 50 provides the decoded signaling information to a microprocessor 56 for further processing. For example, the channel decoder 50 extracts the SACCH that carries the TA parameter, which is used for adjusting the timing of uplink burst transmissions.

The transmitter section 36 includes a microphone 57 for inputting voice signals. According to GSM specified speech coding techniques, a speech coder 58 digitizes and codes the voice signals according to a variety of GSM supported speech coding schemes. The GSM system adopts a voice activated transmission technique, known as discontinuous transmission (DTX), to maximize the spectrum efficiency and battery life and minimize interference. Using an adaptive threshold voice activity detector (VAD) algorithm, the DTX technique turns on the transmitter only during periods of active speech. The speech coder 58 provides a silence information descriptor (SID) signal online 60, which indicates whether the subscriber is silent or not. Therefore, the SID signal corresponds to a message from the mobile unit indicating that it will stop transmission during periods of silence. In response to reception of the SID parameter, the speech coders in the system generate comfort noise during the periods of silence.

A channel coder/interleaver 62 codes the uplink data according to GSM specified algorithms, which improves error detection and correction at the BTS 12. The channel coder/interleaver 62 provides an uplink baseband signal to a GMSK modulator 64, which receives a carrier signal from the local oscillator 41. The GMSK modulator 64 modulates and up converts the uplink baseband signal and applies it to an RF amplifier 65, for transmission trough the antenna 38. A well known frequency synthesizer 66, under the control of the microprocessor 56, supplies the operating frequency information to the local oscillator 41. The microprocessor 56 causes the mobile unit to transmit the RX-QUAL and RX-LEV parameters to the RBS 22 over the SACCH.

In one embodiment, the present invention uses one or a combination of the RX-QUAL, RX-LEV, or TA parameters, which are measures of propagation properties of the downlink RF channel, to allocate multicast or non-multicast channels. The BSC 16, which receives the RX-QUAL and RX-LEV parameters from the mobile unit 12 and the TA parameter from the RBS 22, compares them to corresponding thresholds. Preferably, the corresponding thresholds against which one or a combination of these propagation path parameters are compared are selected such that the parameters falling below the thresholds would indicate a condition warranting the use of multicast channels, and those exceeding the thresholds would indicate a condition warranting the use of non-multicast channels. For example, a TA value above an upper TA threshold would indicate a multicasting condition and a TA value below a lower TA threshold would indicate a non-multicasting condition. Of course, the upper and lower threshold are selected to avoid hystersis. Also, based on the propagation path parameters, the BSC 16 determines whether to perform an intra-BTS handover from the multicast channels to non-multicast channels. Moreover, the BSC 16 can allocate a multicast channel to the mobile unit 12, if it determines, based on for example the RX-LEV that none of the neighboring cells are good candidates for an inter-cell handover.

Figure 6:
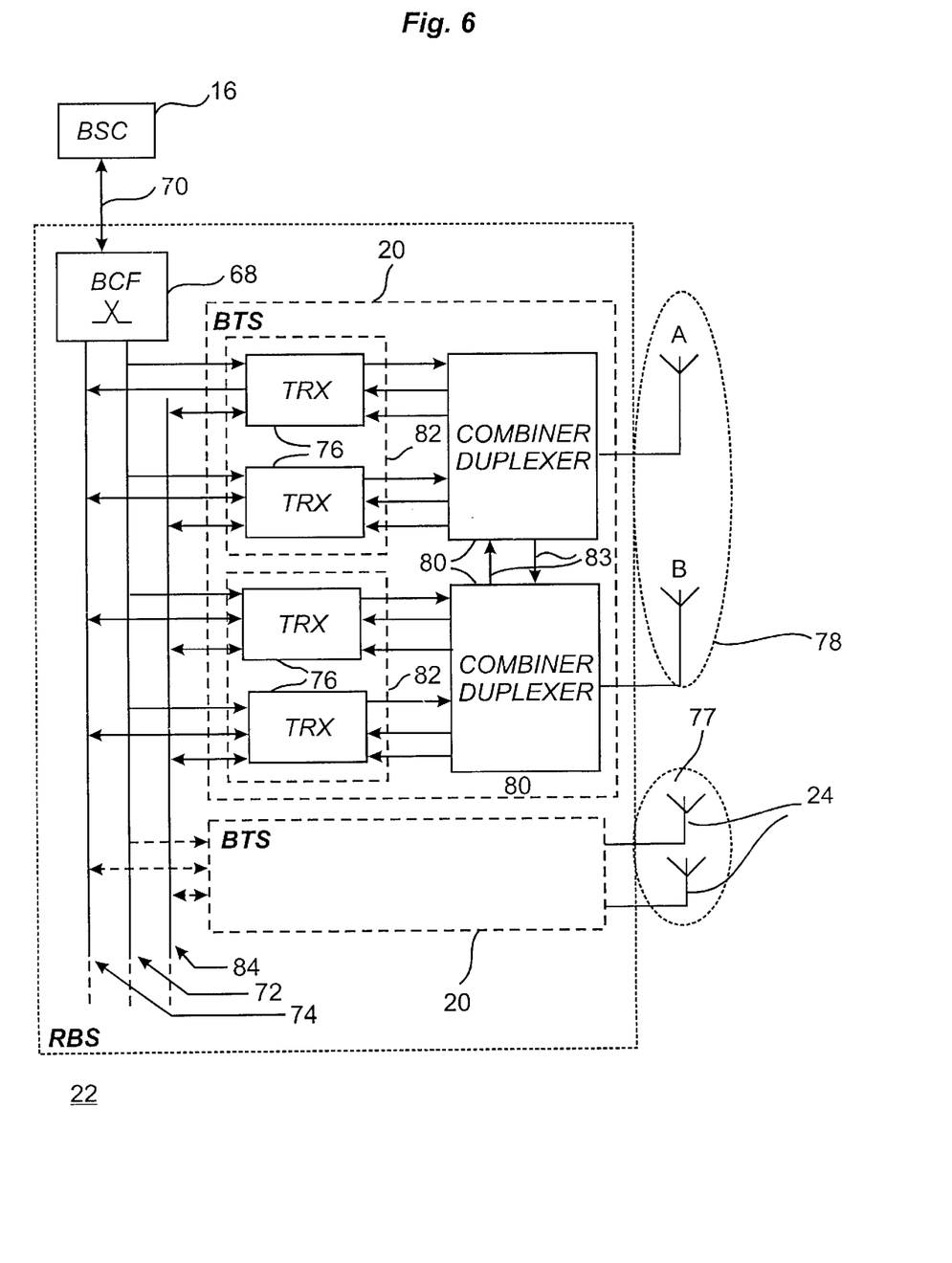
FIG. 6 is a block diagram of a radio base station used in the communication system of FIG. 1.

Referring to FIG. 6, the block diagram of the RBS 22 is shown to include a plurality of BTSs 20 that serve the same or different geographical areas. The RBS 22 includes a base station common function (BCF) block 68 that controls the operation and maintenance of the RBS 22. The BSC 16 interfaces with the BCF 68 through an A-bis interface on line 70. The BCF 68 controls the operation and maintenance (O & M) functions associated with the RBS 22. Through a timing bus 72, the RBS 22 is synchronized with the other components of the system 10 including other RBSs as required under the GSM protocol.

In synchronized systems, the burst transmissions from various RBSs occur at exactly the same times. Under this synchronized configuration, the C/I ratio at two or more separated communication cells may be degraded, if each of the cells engages in multicasting transmission during the same time slot. Preferably, transmission timing of the multicast channels associated with various communication cells are offset with respect to one another by a number of time slots in order to avoid simultaneous transmission of downlink data on the same RF channel during the same time slot. For example, the system 10 allocates a first multicast channel to a first communication cell, and a second multicast channel to a second communication cell, which is separated from the first communication cell by one or more cells. According to this feature, the first multicast channel occurs one or two time slots earlier than the second multicast channel to insure that the C/I ratios associated with communication cells are not degraded because of multicasting. The control of such multicast allocation may be handled at the BSC or MSC level.

Voice and data information are provided to the RBS 22 through a traffic bus 74 that may be coupled, through the A-bis interface, to a public or private voice and data transmission line, such as a T1 line. Each BTS 20 includes a plurality of TRXs 76 that communicate with the mobile unit 12 via the plurality of antennas 24 covering separate geographical areas 77 and 78. The TRXs 76 are coupled to the antennas 24 through combiner/duplexers 80 that combine downlink transmission signals from the TRXs 76 and distribute the uplink received signals from the mobile unit 12.

In an exemplary embodiment, each BTS 20 includes two TRX pairs 82. Each one of the TRX pairs 82 is coupled to a corresponding one of two antennas. Two antennas designated as A and B cover the coverage area 78. As shown, the combiner/duplexers 80 share their received signals on lines 83, to take advantage of the receiver diversity provided by the antennas A and B. Each one of the antennas A or B connects to one of the TRXs in the pair through corresponding combined/duplexers 80. The antenna connection configurations for all antennas of the RBS 22 are stored in the BCF 68. Via the A-bis interface, the BSC 16 can access the antenna connection configuration information, when allocating the TRXs for multicasting or non-multicasting.

Figure 7:
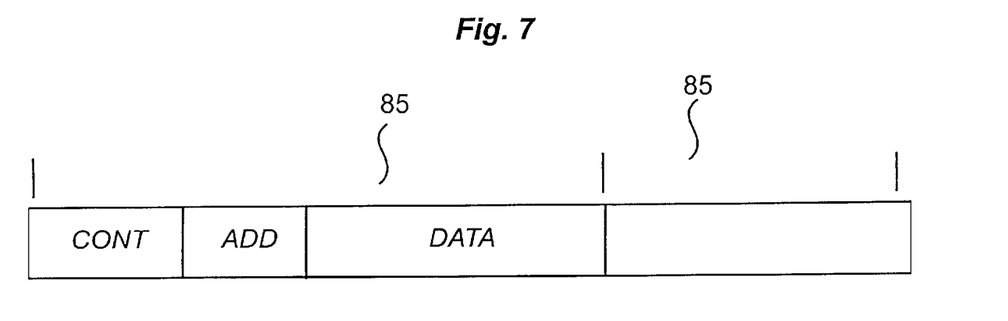
FIG. 7 is a diagram of a broadband bus packet used in the radio base station of FIG. 6.

Each RBS 22 within the system 10 also includes a well known baseband bus 84 that interconnects the TRXs 76 to each other. One such baseband bus is incorporated in the RBS-2000 products. The baseband bus 84, which is a TDMA bus, supports a protocol that allows the RBS 22 to selectively address the TRXs 76 for transmitting information during designated time slots. As shown in FIG. 7, the baseband bus protocol uses separate packets of data 85 to transfer downlink baseband data, as well as address and control information among the TRXs 76. The packets, which are assembled by each TRX 76, carry downlink baseband data and their TRX address over the baseband bus.

Figure 8:
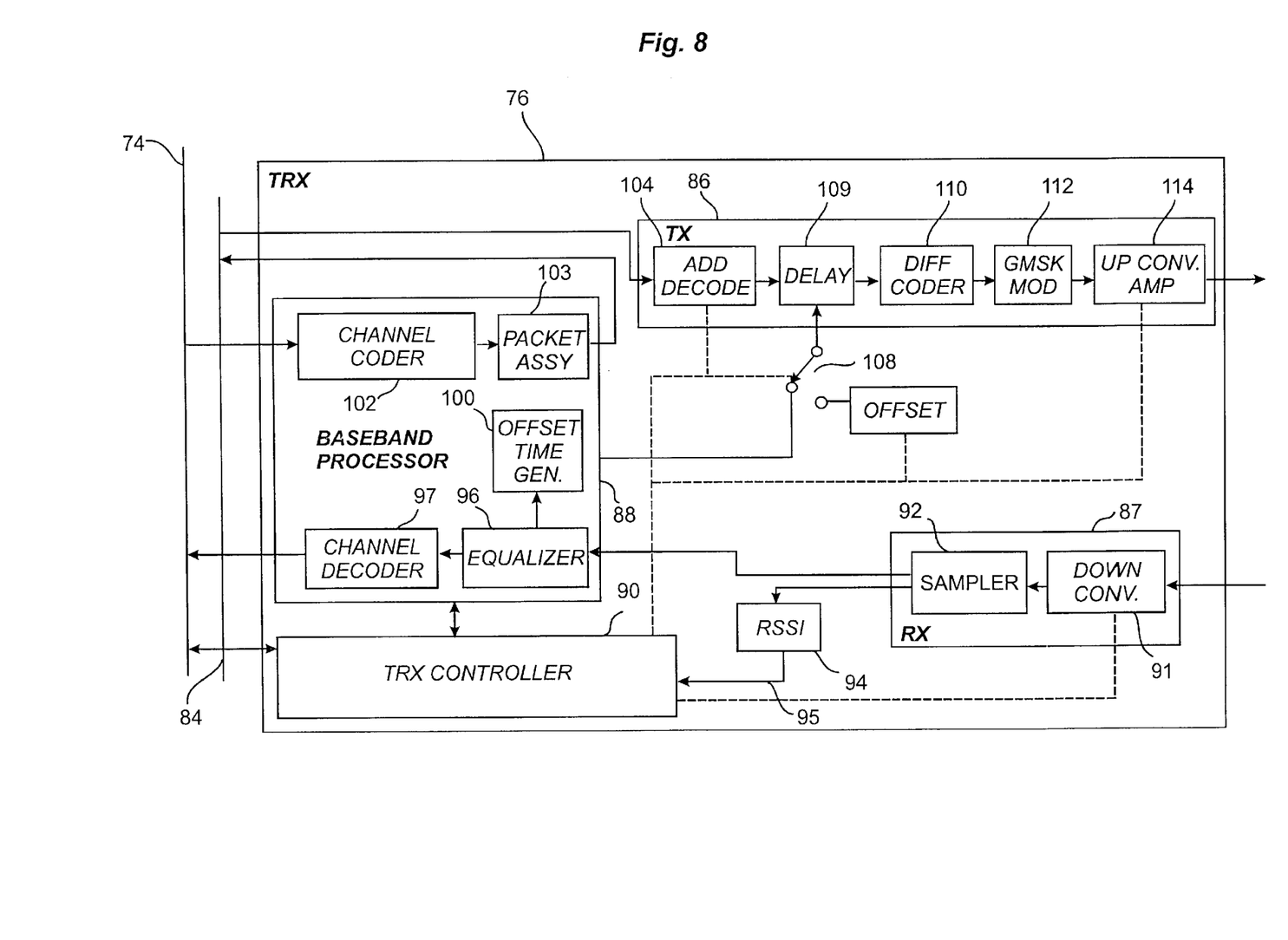
FIG. 8 is a block diagram of a radio transceiver used in the base station of FIG. 6.

Referring to FIG. 8, a block diagram of a TRX 76 is shown. The TRX 76 includes a transmitter section 86, a receiver section 87, a baseband processor 88 and a TRX controller 90. Through a corresponding antenna 24, the receiver section 87 receives the uplink signals from the mobile unit 12, via a down conversion block 91. After down converting the received signals, the receiver section 87 samples its phase and magnitude, via a sampler block 92, to provide received bit sequence to the baseband processor 88. An RSSI estimator 94 provides an RSSI signal on line 95, which is a measure of the received signal strength. The RSSI estimator 94 also measures noise disturbance levels during idle channels. The TRX controller 90, which is coupled to the traffic bus 74, processes the commands received from the BSC 16 and transmits TRX related information, such as various TRX measurements, to the BSC 16. Under this arrangement, the TRX 76 periodically reports the RSSI signal and noise disturbance levels to the BSC 16.

According to one aspect of the present invention, the BSC 16 selects the multicast channels and non-multicast channels based on the idle channel quality of the RF channels. Using its receiver section 87, the TRX detects channel activity by continuously measuring and averaging the noise disturbance levels on the RF channels. Based on such measurement, the TRX 76 can inform the BSC 16 as to the quality of RF channels. By comparing a measurement from a particular channel to an average disturbance level measurement, the BSCs can assess the quality of a particular channel. The lower the disturbance level, the better the transmission quality would be on that channel. During an initial selection phase, the BSC 16 determines the idle channel quality for each RF channel, and allocates the multicasting and non-multicasting channels based on a predefined criteria associated with the channel quality. For example, the RF channels having a channel quality that exceeds a predefined threshold may be allocated as non-multicasting channels, because the downlink transmission quality provided by such channels may not require multicasting. Conversely, the RF channels having a channel quality below the threshold may be allocated as multicasting channel, to improve downlink coverage on such channels.

The baseband processor 88 includes an equalizer 96 that receives the uplink baseband data from the receiver section 87. The equalizer 96 generates correlator responses that are processed in a well known manner to retrieve the uplink baseband data. The uplink baseband data is applied to a channel decoder 97 that decodes the baseband signal according to the GSM specified protocol. The channel decoder 97 places the decoded baseband signal on the traffic bus 78, for further processing by the BSC 16.

According to another aspect of the present invention, the multicast channel transmissions from two or more antennas 24 may be offset in time based on the propagation properties of the RF channel that links the mobile unit 12 to a BTS 20 (or an RBS 22). As a result, the system of the present invention introduces time diversity as well as space or polarization diversity into the propagation path of the RF links. The offset transmission may also originate from more than one transmitter using the same antenna but at separate times. By transmitting from the same antenna, the present invention only introduces time diversity into the propagation path of the RF links and increased transmitted power. In case three or more antennas are used for introducing time diversity, the BSC may specify various corresponding offset times for the downlink transmissions. In one feature of the invention, the BSC 16 fixes the multicast offset times. This way, each BTS 20 transmits the information bursts from two or more antennas 24 in times that are offset from each other according to BSC dictated multicast offset times. The BSC 16 may fix the multicast offset time anywhere from no offset to an offset corresponding to a multiple of symbol times. For example, the multicast offset time may be one, two or three symbol times or fractions of them. In this way, the TRX 76 delays or advances the multicast burst transmissions based on corresponding multicast offset times set by the BSC 16.

In another feature of the present invention, the multicast offset time may also be determined dynamically by the TRX 76 based on the multipath propagation properties of the uplink RF channel. Based on a principle known as Wide Sense Stationary Uncorrelated Scattering or WSSUS, the multipath properties of the uplink and the downlink RF channels are reciprocal and do not vary substantially over a few short burst durations. The present invention uses the WSSUS principle for optimizing the selection of the multicast offset time. Preferably, the multicast offset time is determined by identifying when the least amount of energy is found on the propagation path of the uplink RF channel.

Referring back to FIG. 4, the correlator responses generated by the equalizer 96 of one such TRX includes the correlator peaks 35 that correspond to the multipath properties of the uplink channel. These responses are provided within a correlator time window 93, which corresponds to a limited number of symbol times. The multicasting offset time is preferably set to a time that coincides with a minimum correlator response level. The minimum correlator response level represents the time when minimum energy is present at the uplink propagation path.

FIG. 4 shows a correlation peak 98 (shown in dotted-line) that is generated by transmitting downlink bursts at a multicast offset time t3, when the least amount of energy is found. Therefore, the multicast offset time according to this aspect of the present invention fills an energy gap between the correlation peaks occurring at times t1 and t2. In this way, strong normal multipath components that are received by the mobile 12 unit are not disturbed, while at the same time, the multicast generated components positively contribute to the demodulation process at the mobile unit 12. FIG. 4 also shows in dotted line multipath components 99 of the multicast downlink burst. The multicast offset time, shown as offset symbol times, may be zero, one or more multiples of symbol times (or their fractions) within the correlator time window.

In case the correlator responses indicate a large time dispersion that falls outside of the correlator time window, then the multicasting offset time is set to a predefined number of time symbols. Preferably, the predefined number of time symbols is a low number of time symbols, such as zero or one time symbol, so as to not introduce inter-symbol interference that can not be handled by the equalizer of the mobile unit.

During multicasting, the receiver section 87 of a TRX 76 involved in multicasting is idle. Preferably, the present invention uses the idle receiver section 87, to detect when the least amount of energy is found on the propagation path of the uplink RF channel. Accordingly, the idle receiver section 87 monitors the received signals from the mobile unit 12, to determine the multipath properties of the uplink RF channel. As show in FIG. 8, the baseband processor 88 includes an offset time generator block 100 that generates a multicast offset time based on correlator responses provided by the equalizer 96, when the receiver section 87 is idle.

In addition, the idle receiver section 87 of a TRX 76 is used by the present invention for monitoring the co-channel interference from cells that reuse the RF channels. During the periods of silence, which is indicated by the SID parameter during a call, the idle receiver section 87 measures the co-channel interference 16 on an active channel. Preferably, based on such measurement, the BSC 16 prevents multicasting on the co-channels if the idle receiver section 87 detects channel activity on such channels during the periods of silence. Consequently, multicast interference with other users of the same channel in other cells is avoided. Accordingly, the BSC 16 is responsive to a measure of co-channel interference during a call for allocating or de-allocating the multicast and non-multicast channels.

When transmitting downlink baseband data, the baseband processor 88 receives properly coded digitized speech from the BSC 16 over the traffic bus 74 and applies it to a channel coder 102 that codes and multiplexes the speech according to a GSM specified protocol. The baseband processor 88 includes a packet assembly block 103 that associates the downlink baseband data with a BSC supplied address and places an appropriately formatted baseband packet (shown in FIG. 7) on the baseband bus 84. This way, the downlink baseband data packets assembled by the baseband processors 88 become associated with the address of the TRXs selected by the BSC 16 for multicast transmissions.

The transmitter section 86 of the TRX 76, which is coupled to the baseband bus 84 includes an address decoder 104, for decoding the address placed on the baseband bus 84, to determine whether it is addressed to transmit the down link baseband data provided on the baseband bus. By decoding the same address, multiple addressed TRXs receive the downlink baseband data simultaneously. Before each transmission, the transmitter section introduces a transmission delay, via a transmission delay block 109, that corresponds to the multicast offset time. As described before, the multicast offset time may be fixed by the BSC 16, or it may be dynamically determined within the TRX 76. As depicted by a switch 108, which is controlled by the BSC 16, the TRX 76 may be set to use the fixed or the dynamically determined multicast offset time. The transmitter section 86 includes a differential coder 110 that supplies properly coded data bits to a GMSK modulator 112. The GMSK modulator 112 modulates the supplied data bits and provides downlink baseband signals to an up conversion Amp block 114 for up conversion and amplification before transmission through a corresponding antenna.

According to yet another feature of the present invention, the BSC 16 instructs one or more TRXs to listen to the same address during the same baseband packets, for retrieving downlink baseband data over the baseband bus 84. The BSC 16, which is kept informed of various operating conditions including antenna connection configuration within the RBS 22, supplies address and timing information to the TRXs 76 over the traffic channel. By providing the same address to multiple TRXs 76 on the baseband bus 84, the same downlink baseband data may be transmitted during allocated multicast channels via antennas 24 that are coupled to the corresponding TRXs 76. In this way, downlink baseband data can be transmitted by the transmitter sections 86 of the selected TRXs 76. Thereafter, based on either a fixed multicast offset time provided by the BSC 16 or a dynamically determined multicast offset time by the TRX 76, the transmitter section 86 adjusts the transmission timing of the downlink bursts through corresponding antennas.

Based on the information provided over the traffic bus, the BCF 68 determines the fault conditions associated with each one of the TRXs. The BCF reports the fault conditions to the BSC via the A-bis bus. According to yet another feature of the present invention, the BSC 16 reconfigures and reallocate the RBS resources used for multicasting based on RBS fault reports. For example, if the RBS 22 reports a fault condition on one of its transmitter sections, the BSC 16 would not allocate the faulty TRX 76 for multicasting. If the fault is developed during the RBS operation, a TRX 76 allocated for multicasting would be de-allocated, even eliminated, as a resource until the fault condition is cured. Once cured, the TRX 76 may be allocated for multicasting by the BSC 16.

From the foregoing description, it will be appreciated that the communication system 10 according to the present invention substantially improves downlink transmissions, while providing an efficient allocation of multicasting and non-multicasting resources. It has been determined that the present invention improves the downlink coverage of the system by up to 5 dB. The present invention allocates the multicasting and non-multicasting resources based on individual RF links between the mobile units 12 and the BTSs 20 as well as based on the operating conditions of the system 10. As described above, the improved coverage is traded for capacity in a dynamic manner. In a synchronized network, the present invention improves the C/I ratio by offsetting the multicasting of the co-channels by a number of time slots. The allocation of resources according to the present invention increases communication throughput within the system 10, which would allow more calls to go through, especially in heavily congested communication cells.

Although the invention has been described in detail with reference only to a preferred embodiment, those skilled in the art will appreciate that various modifications can be made without departing from the invention. Accordingly, the invention is defined only by the following claims which are intended to embrace all equivalents thereof.

What is claimed is:

1. A digital communication system for providing communication coverage over radio frequency (RF) channels that are subdivided into a plurality of time slots during which information is communicated with at least one mobile unit, comprising:

a base station including a plurality of antennas for transmitting the information to the mobile unit on any one of a number of multicast and non-multicast channels, wherein the non-multicast channels are time slots during which the information is transmitted from only one of the antennas, and the multicast channels are other time slots during which the same information is transmitted from more than one of the antennas; and a controller that allocates multicast and non-multicast channels for use in transmitting the information to the mobile unit based on a measure of the propagation property of at least one of the RF channels linking the mobile unit to the base station.

2. The communication system of claim 1, wherein the information is transmitted on the multicast channels from at least two antennas at separate times that are offset from each other by a multicast offset time.

3. The communication system of claim 2, wherein the multicast offset time is set to a fixed value.

4. The communication system of claim 2, wherein the multicast offset time corresponds to a measure of multipath propagation property of the RF channels linking the mobile unit to the base station.

5. The communication system of claim 4, wherein the multicast offset time corresponds to a time when the least amount of energy is detected from various propagation paths of an uplink RF channel.

6. The communication system of claim 5, wherein the base station includes an equalizer for providing a correlator response that indicates when the least amount of energy is present.

7. The communication system of claim 6, wherein the correlator response is provided within a correlator time window, and wherein the multicasting offset time is within the correlator time window.

8. The communication system of claim 4, wherein the base station includes a plurality of radio transceivers having corresponding receiver and transmitter sections coupled to the antennas, wherein an idle receiver section of the radio transceiver whose transmitter section is used for multicasting measures the multipath propagation property of the RF channels linking the mobile unit to the base station.

9. The communication system of claim 1, wherein the measure of the propagation property corresponds to a measure of the received signal strength at the mobile unit.

10. The communication system of claim 1, wherein the measure of the propagation property corresponds to a measure of bit error rate at the mobile unit.

11. The communication system of claim 1, wherein the measure of the propagation property corresponds to a measure of propagation delay of a signal transmitted from the mobile unit.

12. The communication system of claim 1, wherein the base station measures co-channel interference level of RF channels, wherein the controller is responsive to the measure of co-channel interference level for selecting the multicast and non-multicast channels.

13. The communication system of claim 12, wherein the co-channel interference level is measured on an active channel in response to a message indicating the mobile unit will stop transmitting.

14. The communication system of claim 12, wherein the co-channel interference level is measured during idle channels.

15. The communication system of claim 1, wherein the base station includes a plurality of transmitter sections coupled to the antennas and a baseband bus for selective addressing of the transmitter sections for transmitting during the non-multicast or multicast channels.

16. The communication system of claim 1, wherein the controller allocates the multicast and non-multicast channels based on fault reports received from the base station.

17. The communication system of claim 1, wherein the antennas are configured for space diversity.

18. The communication system of claim 1, wherein the antennas are configured for polarization diversity.

19. A digital communication system for providing communication coverage using radio frequency (RF) channels over which information is communicated with at least one mobile unit, comprising:

a base station including a plurality of antennas for transmitting the information to the mobile unit on any one of a number of multicast and non-multicast channels, wherein the non-multicast channels are RF channels for transmitting the information from only one of the antennas, and the multicast channels are RF channels for transmitting the information from more than one of the antennas; wherein the information is transmitted on the multicast channels from at least two of the antennas at separate times that are offset from each other by a multicast offset time that corresponds to a first measure of the propagation property of at least one of the RF channels linking the mobile unit to the base station.

20. The communication system of claim 19, wherein the RF channel is divided into time slots, wherein the non-multicast channels are time slots during which the information is transmitted from only one of the antennas, and the multicast channels are other time slots during which the same information is transmitted from more than one of the antennas; and wherein the communication system further includes a controller that allocates multicast and non-multicast channels for use in transmitting the information to the mobile unit based on a second measure of the propagation property of at least one of the RF channels linking the mobile unit to the base station.

21. The communication system of claim 19, wherein the multicast offset time is set to a fixed value.

22. The communication system of claim 19, wherein the multicast offset time corresponds to a measure of multipath propagation property of the RF channels linking the mobile unit to the base station.

23. The communication system of claim 22, wherein the multicast offset time corresponds to a time when the least amount of energy is detected from various propagation paths of an uplink RF channel.

24. The communication system of claim 23, wherein the base station includes an equalizer for providing a correlator response that indicates when the least amount of energy is present.

25. The communication system of claim 24, wherein the correlator response is provided within a correlator time window, and wherein the multicasting offset time is within the correlator time window.

26. The communication system of claim 22, wherein the base station includes a plurality of radio transceivers having corresponding receiver and transmitter sections coupled to the antennas, wherein an idle receiver section of the radio transceiver whose transmitter section is used for multicasting measures the multipath propagation property of the RF channels linking the mobile unit to the base station.

27. The communication system of claim 20, wherein the second measure of the propagation property corresponds to a measure of the received signal strength at the mobile unit.

28. The communication system of claim 20, wherein the second measure of the propagation property corresponds to a measure of bit error rate at the mobile unit.

29. The communication system of claim 20, wherein the second measure of the propagation property corresponds to a measure of propagation delay of a signal transmitted from the mobile unit.

30. The communication system of claim 20, wherein the base station measures co-channel interference level of RF channels, wherein the controller is responsive to the measure of co-channel interference level for selecting the multicast and non-multicast channels.

31. The communication system of claim 30, wherein the co-channel interference level is measured on an active channel in response to a message indicating that the mobile unit will stop transmitting.

32. The communication system of claim 30, wherein the co-channel interference level is measured on idle channels.

33. The communication system of claim 20, wherein the base station includes a plurality of transmitter sections coupled to the antennas and a baseband bus for selective addressing of the transmitter sections for transmitting during the non-multicast or multicast channels.

34. The communication system of claim 20, wherein the switch controller allocates the multicast and non-multicast channels based on fault reports received from the base station.

35. The communication system of claim 19, wherein the antennas are configured for space diversity.

36. The communication system of claim 19, wherein the antennas are configured for polarization diversity.

37. A base station for transmitting over RF channels that are subdivided into a plurality of time slots during which information is communicated with at least one mobile unit, comprising:

a plurality of transmitters that couple to a plurality of antennas for transmitting the information to the mobile unit on any one of a number of multicast and non-multicast channels, wherein the non-multicast channels are time slots during which the information is transmitted from only one of the antennas, and the multicast channels are other time slots during which the same information is transmitted from more than one of the antennas; and a controller that allocates multicast and non-multicast channels for use in transmitting the information to the mobile unit based on a measure of the propagation property of at least one of the RF channels linking the mobile unit to the base station.

38. The base station of claim 37, wherein the information is transmitted on the multicast channels from at least two antennas at separate times that are offset from each other by a multicast offset time.

39. The base station of claim 38, wherein the multicast offset time is set to a fixed value.

40. The base station of claim 38, wherein the multicast offset time corresponds to a measure of multipath propagation property of the RF channels linking the mobile unit to the base station.

41. The base station of claim 40, wherein the multicast offset time corresponds to a time when the least amount of energy is detected from various propagation paths of an uplink RF channel linking the mobile unit to the base station.

42. The base station of claim 41, wherein the base station further includes an equalizer for providing a correlator response that indicates when the least amount of energy is present.

43. The base station of claim 42, wherein the correlator response is provided within a correlator time window, and wherein the multicasting offset time is within the correlator time window.

44. The base station of claim 40, wherein the base station further includes a plurality of radio transceivers having corresponding receiver and transmitter sections coupled to the antennas, wherein an idle receiver section of the radio transceiver whose transmitter section is used for multicasting measures the multipath propagation property of at least one uplink RF channel linking the mobile unit to the base station.

45. The base station of claim 37, wherein the measure of the propagation property of the RF channels linking the mobile unit to the base station corresponds to a measure of the received signal strength at the mobile unit.

46. The base station of claim 37, wherein the measure of the propagation property of the RF channels linking the mobile unit to the base station corresponds to a measure of bit error rate at the mobile unit.

47. The base station of claim 37, wherein the measure of the propagation property of the RF channels linking the mobile unit to the base station corresponds to a measure of the multipath propagation property of a signal transmitted from the mobile unit.

48. The base station of claim 37, wherein the base station measures co-channel interference level of RF channels, wherein the controller is responsive to the measure of co-channel interference level for selecting the multicast and non-multicast channels.

49. The base station of claim 48, wherein the co-channel interference level is measured on an active channel in response to a message indicating the mobile unit stop transmitting.

50. The base station of claim 48, wherein the co-channel interference level is measured during idle channels.

51. The base station of claim 37, wherein the base station includes a plurality of transmitter sections coupled to the antennas and a baseband bus for selective addressing of the transmitter sections for transmitting the non-multicast or multicast channels.

52. The base station of claim 37, wherein the switch controller allocates the multicast and non-multicast channels based on fault reports received from the base station.

53. The base station of claim 37, wherein the antennas are configured for space diversity.

54. The base station of claim 37, wherein the antennas are configured for polarization diversity.

55. A base station for transmitting information to a mobile unit over radio frequency (RF) channels, comprising:
  a plurality of transmitters coupled to a corresponding plurality of antennas for transmitting the information to the mobile unit on any one of a number of multicast and non-multicast channels, wherein the non-multicast channels are RF channels for transmitting the information from only one of the antennas, and the multicast channels are RF channels for transmitting the information from more than one of the antennas; wherein the information is transmitted on the multicast channels from at least two antennas at separate times that are offset from each other by a multicast offset time that corresponds to a first measure of the propagation property of at least one of the RF channels linking the mobile unit to the base station.

56. The base station of claim 55, wherein the RF channel is divided into time slots, wherein the non-multicast channels are time slots during which the information is transmitted from only one of the antennas, and the multicast channels are other time slots during which the same information is transmitted from more than one of the antennas; and wherein the base station further includes a controller that allocates multicast and non-multicast channels for use in transmitting the information to the mobile unit based on a second measure of the propagation property of at least one of the RF channels linking the mobile unit to the base station.

57. The base station of claim 55, wherein the multicast offset time is set to a fixed value.

58. The base station of claim 55, wherein the multicast offset time corresponds to a measure of multipath propagation property of the RF channels linking the mobile unit to the base station.

59. The base station of claim 58, wherein the multicast offset time corresponds to a time when the least amount of energy is detected from various propagation paths of an uplink RF channel linking the mobile unit to the base station.

60. The base station of claim 59, wherein the base station includes an equalizer for providing a correlator response that indicates when the least amount of energy is present.

61. The base station of claim 60, wherein the correlator response is provided within a correlator time window, and wherein the multicast offset time is within the correlator time window.

62. The base station of claim 58, wherein the base station includes a plurality of radio transceivers having corresponding receiver and transmitter sections coupled to the antennas, wherein an idle receiver section of the radio transceiver whose transmitter section is used for multicasting measures the multipath propagation property of the RF channels linking the mobile unit to the base station.

63. The base station of claim 56, wherein the measure corresponds to a measure of the received signal strength at the mobile unit.

64. The base station of claim 56, wherein the measure of the propagation property of the RF channel for selecting the multicast and non-multicast channels corresponds to a measure of bit error rate at the mobile unit.

65. The base station of claim 56, wherein the base station measures co-channel interference level of RF channels, wherein the controller is responsive to the measure of co-channel interference level for selecting the multicast and non-multicast channels.

66. The base station of claim 65, wherein the co-channel interference level is measured on an active channel in response to a message indicating that the mobile unit will stop transmitting.

67. The base station of claim 65, wherein the co-channel interference level is measured during idle channels.

68. The base station of claim 56, wherein the base station includes a plurality of transmitter sections coupled to the antennas and a baseband bus for selective addressing of the transmitter sections for transmitting during the non-multicast or multicast channels.

69. The base station of claim 56, wherein the controller allocates the multicast and non-multicast channels based on fault reports received from the base station.

70. The base station of claim 55, wherein the antennas are configured for space diversity.

71. The base station of claim 55, wherein the antennas are configured for polarization diversity.

72. A method of communicating information between a base station with a plurality of antennas and at least one mobile unit over radio frequency (RF) channels that are subdivided into a plurality of time slots, comprising:
  transmitting the information to the mobile unit on any one of a number of multicast and non-multicast channels, wherein the non-multicast channels are time slots during which the information is transmitted from only one of the antennas, and the multicast channels are other time slots during which the same information is transmitted from more than one of the antennas; and
  allocating multicast and non-multicast channels for use in transmitting the information to the mobile unit based on a measure of the propagation property of at least one of the RF channels linking the mobile unit to the base station.

73. An apparatus for communicating information between a base station with a plurality of antennas and at least one mobile unit over radio frequency (RF) channels that are subdivided into a plurality of time slots, comprising:
  means for transmitting the information to the mobile unit on any one of a number of multicast and non-multicast channels, wherein the non-multicast channels are time slots during which the information is transmitted from only one of the antennas, and the multicast channels are other time slots during which the same information is transmitted from more than one of the antennas; and
  means for allocating multicast and non-multicast channels for use in transmitting the information to the mobile unit based on a measure of the propagation property of at least one of the RF channels linking the mobile unit to the base station.

74. A method of communicating information between a base station and at least one mobile unit over radio frequency (RF) channels, comprising:

transmitting the information to the mobile units from a plurality of antennas on any one of a number of multicast and non-multicast channels, wherein the non-multicast channels are RF channels for transmitting the information from only one of the antennas, and the multicast channels are RF channels for transmitting the information from more than one of the antennas;

measuring the propagation property of at least one of the RF channels linking the mobile unit to the base station; and offsetting the transmission of the information on the multicast channels from at least two antennas at separate times by a multicast offset time that corresponds to the measure of the propagation property of the at least one of the RF channels linking the mobile unit to the base station.

75. An apparatus for communicating information between a base station and at least one mobile unit over radio frequency (RF) channels, comprising:

means for transmitting the information to the mobile units from a plurality of antennas on any one of a number of multicast and non-multicast channels, wherein the non-multicast channels are RF channels for transmitting the information from only one of the antennas, and the multicast channels are RF channels for transmitting the information from more than one of the antennas;

means for measuring the propagation property of at least one of the RF channels linking the mobile unit to the base station; and means for offsetting the transmission of the information on the multicast channels from antennas at separate times by a multicast offset time that corresponds to the measure of the propagation property of the at least one of the RF channels linking the mobile unit to the base station.

\* \* \* \* \*